United States Patent [19]
Hiratsuka

[11] Patent Number: 5,912,983
[45] Date of Patent: Jun. 15, 1999

[54] OVERLAY ACCURACY MEASURING METHOD

[75] Inventor: Tsuyoshi Hiratsuka, Kurokawa-gun, Japan

[73] Assignee: Oki Electric Industry Co., Ltd, Tokyo, Japan

[21] Appl. No.: 08/900,337

[22] Filed: Jul. 25, 1997

[30] Foreign Application Priority Data

Jan. 24, 1997 [JP] Japan .................................... 9-010811

[51] Int. Cl.⁶ ...................................................... G06K 9/00
[52] U.S. Cl. .......................................... 382/144; 382/294
[58] Field of Search .................................... 382/144, 145, 382/149, 151, 294; 430/20, 30; 364/488; 250/548; 356/399–401

[56] References Cited

U.S. PATENT DOCUMENTS

| | | | |
|---|---|---|---|
| 5,617,211 | 4/1997 | Nara et al. | 356/401 |
| 5,663,893 | 9/1997 | Wampler | 364/491 |
| 5,770,337 | 6/1998 | Chiang | 382/144 |
| 5,798,195 | 8/1998 | Nishi | 430/30 |

*Primary Examiner*—Christopher S. Kelley
*Attorney, Agent, or Firm*—Venable; Robert J. Frank

[57] ABSTRACT

The method of the present invention is used to measure overlay accuracy between a first pattern including a plurality of marks formed on a substrate and a second pattern including a plurality of marks formed on the first pattern. First overlay accuracy is measured by using an erected image of a combination of marks of first and second patterns corresponding to each other. Second overlay accuracy is measured by using an inverted image of the combination of marks. Third overlay accuracy is measured by using an erected image or an inverted image of the combination of marks. Differences between the first overlay accuracy measured by using the erected image and the second overlay accuracy measured by using the inverted image are respectively obtained with respect to some combinations of marks of first and second patterns. An average of the differences is calculated. All measured values of the first overlay accuracy and the third overlay accuracy or the second overlay accuracy and the third overlay accuracy are corrected based on the average. Thus, it is possible to correct measured values of overlay accuracy at a short time.

7 Claims, 5 Drawing Sheets

FIG. 1(a)

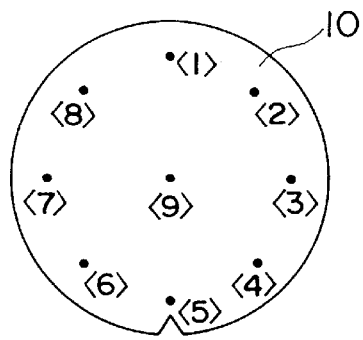

ERECTED IMAGE

FIG. 1(b)

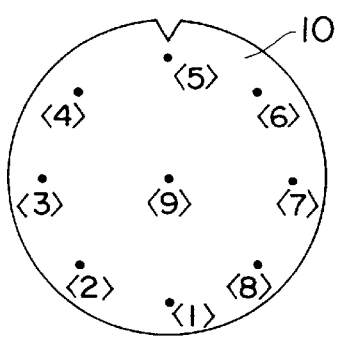

INVERTED IMAGE

• ···· MEASURING POINT

FIG. 1(c)

| ERECTED IMAGE MEASURED VALUE | INVERTED IMAGE MEASURED VALUE | TRUE ERECTED IMAGE | TIS |
|---|---|---|---|
| $X_1$ | $X'_1$ | $S_{X1}$ | $X_{TIS1}$ |
| $X_2$ | $X'_2$ | $S_{X2}$ | $X_{TIS2}$ |
| $X_3$ | $X'_3$ | $S_{X3}$ | $X_{TIS3}$ |
| ⋮ | ⋮ | ⋮ | ⋮ |
| $X_9$ | $X'_9$ | $S_{X9}$ | $X_{TIS9}$ |
| STANDARD DEVIATION | | | $X_{TIS\sigma}$ |

FIG. 1(d)

| ERECTED IMAGE MEASURED VALUE | INVERTED IMAGE MEASURED VALUE | TRUE ERECTED IMAGE | TIS |
|---|---|---|---|
| $Y_1$ | $Y'_1$ | $S_{Y1}$ | $Y_{TIS1}$ |
| $Y_2$ | $Y'_2$ | $S_{Y2}$ | $Y_{TIS2}$ |
| $Y_3$ | $Y'_3$ | $S_{Y3}$ | $Y_{TIS3}$ |
| ⋮ | ⋮ | ⋮ | ⋮ |
| $Y_9$ | $Y'_9$ | $S_{Y9}$ | $Y_{TIS9}$ |
| STANDARD DEVIATION | | | $Y_{TIS\sigma}$ |

FIG. 2(a)

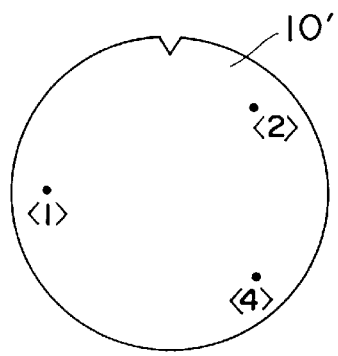

INVERTED IMAGE

FIG. 2(b)

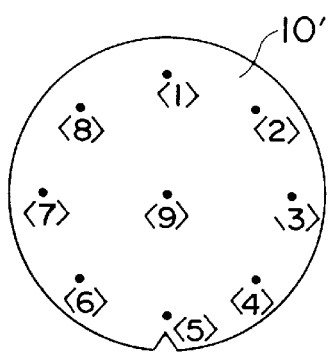

ERECTED IMAGE  • ··· MEASURING POINT

FIG. 2(c)

| ERECTED IMAGE MEASURED VALUE | INVERTED IMAGE MEASURED VALUE | TRUE ERECTED IMAGE | TIS |
|---|---|---|---|
| $X_1$ | — | — | — |
| $X_2$ | $X'_1$ | $S_{X1}$ | $X_{TIS1}$ |
| $X_3$ | — | — | — |
| $X_4$ | $X'_2$ | $S_{X2}$ | $X_{TIS2}$ |
| $X_5$ | — | — | — |
| $X_6$ | — | — | — |
| $X_7$ | $X'_3$ | $S_{X3}$ | $X_{TIS3}$ |
| $X_8$ | — | — | — |
| $X_9$ | — | — | — |
| STANDARD DEVIATION $X_{ave}$ | — | — | $X_{TISave}$ |

FIG. 2(d)

| ERECTED IMAGE MEASURED VALUE | INVERTED IMAGE MEASURED VALUE | TRUE ERECTED IMAGE | TIS |
|---|---|---|---|
| $Y_1$ | — | — | — |
| $Y_2$ | $Y'_1$ | $S_{Y1}$ | $Y_{TIS1}$ |
| $Y_3$ | — | — | — |
| $Y_4$ | $Y'_2$ | $S_{Y2}$ | $Y_{TIS2}$ |
| $Y_5$ | — | — | — |
| $Y_6$ | — | — | — |
| $Y_7$ | $Y'_3$ | $S_{Y3}$ | $Y_{TIS3}$ |
| $Y_8$ | — | — | — |
| $Y_9$ | — | — | — |
| STANDARD DEVIATION $Y_{ave}$ | — | — | $Y_{TISave}$ |

ERECTED IMAGE

INVERTED IMAGE

FIG. 5(a)
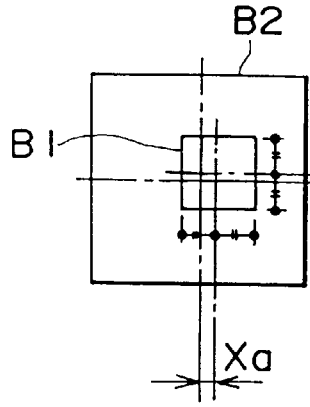
Xa: SHIFT IN X DIRECTION
Ya: SHIFT IN Y DIRECTION
• ··· MEASURING POINT
PRIOR ART
FIG. 5(b)
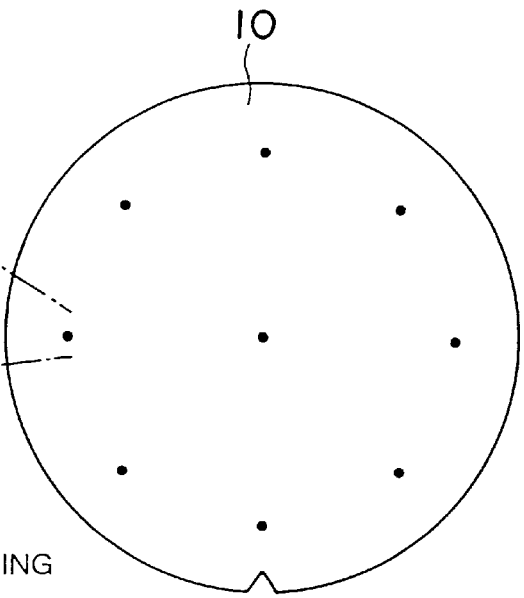
PRIOR ART
FIG. 5(c)
| | | |
|---|---|---|
| | $X_1$ | $Y_1$ |
| | $X_2$ | $Y_2$ |
| | $X_3$ | $Y_3$ |
| | ⋮ | ⋮ |
| | $X_n$ | $Y_n$ |
| AVERAGE | Xave | Yave |
| STANDARD DEVIATION | $X\sigma$ | $Y\sigma$ |
PRIOR ART

OVERLAY ACCURACY MEASURING METHOD

BACKGROUND OF THE INVENTION

1. Field of the Invention

The present invention relates to an overlay accuracy measuring method when patterns are overlaid on a substrate.

2. Description of the Related Art

In the lithographic process for fabricating an semiconductor device and the like, an upper pattern is overlaid on a lower pattern formed on a wafer. This overlay accuracy becomes an important point to improve operating characteristics in the semiconductor device.

Conventionally, according to a method of measuring pattern overlay accuracy, plane images at some points in a lower measuring pattern (such as a box pattern) and an upper measuring pattern (such as a box pattern larger than the lower measuring pattern ) are taken by an optical microscope, and then shifts at a central position (shifts in X and Y directions) are measured for respective measuring patterns, whereby overlay accuracy is measured.

FIGS. 5(a) through 5(c) are views explaining a conventional method. FIG. 5(a) is an enlarged view of a measuring pattern. FIG. 5(b) is a view illustrating measuring points on a wafer. FIG. 5(c) is a view illustrating a measured result.

That is, as shown in FIG. 5(a), a lower box pattern B1 and an upper box pattern B2 are formed as a measuring pattern. Then, shifts Xa, Ya at the central position are measured every measuring point (indicated by °) on a wafer 10 shown in FIG. 5(b).

The plane images of the respective pattern B1, B2 are taken by the optical microscope and the respective central positions are automatically obtained, whereby shifts are calculated. When there are n measuring points, shifts at the n measuring points in X and Y directions ($X_1, Y_1, X_2, Y_2, X_3, Y_3 \ldots X_n, Y_n$) are obtained, and then averages $X_{ave}, Y_{ave}$ and standard deviations $X\sigma, Y\sigma$ are calculated.

However, in this overlay accuracy measuring method, since light and darkness of patterns are measured optically by using the optical microscope, measured values are influenced by image distortion and measurement errors occur.

Among measurement errors, there is an error which absolute values of measured values are not equal when an object is measured by an erected image and an inverted image, namely, TIS (Tool Induced Shift).

As shown in FIG. 3(a), shifts X, Y between the central positions of the patterns B1, B2 are measured by the erected image, and as shown in FIG. 3(b), shifts X', Y' between the central positions of the patterns B1', B2' are measured by the inverted image. In case of $|X| \neq |X'|$, $|Y| \neq |Y'|$, the differences thereof are TISs.

Two correction methods are mentioned to delete those TISs. (1) In one method, TIS is previously obtained every process/step, and the following overlay accuracy is measured while being corrected by the TIS. (2) In another method, the erected image and the inverted image are measured at all measuring points whenever overlay accuracy is measured, and TISs are corrected.

However, according to the one method (1), TIS is constant under the same condition, however, TIS varies since optical characteristics in a measuring apparatus and patterns to be measured vary, therefore, it is impossible to efficiently correct measured values by the TIS previously obtained. Further, according to the another method (2), though the measured value is not influenced by variations of the optical characteristics in the measuring apparatus and of patterns to be measured, there is a problem that it takes a very long for the measuring time.

SUMMARY OF THE INVENTION

Accordingly, it is an object of the present invention to provide an overlay accuracy measuring method in which it is possible to efficiently correct measured values by TISs and to shorten the measuring time for overlay accuracy.

To solve the above-mentioned problems, the present invention provides an overlay accuracy measuring method as follows.

The overlay accuracy measuring method is used to measure overlay accuracy between a first pattern including a plurality of marks formed on a substrate and a second pattern including a plurality of marks formed on the first pattern. Each of the marks of first pattern is positioned in correspondence with any one of the marks of the second pattern.

First, first overlay accuracy is measured by using an erected image of a combination of marks of first and second patterns corresponding to each other. Second overlay accuracy is measured by using an inverted image of the combination of marks.

Then, differences are respectively obtained between the first overlay accuracy measured by using the erected image and the second overlay accuracy measured by using the inverted image. An average is calculated of the differences obtained with respect to some combinations of marks of first and second patterns. Third overlay accuracy is measured by using an erected image or an inverted image of each of other combinations of marks of first and second patterns. All measured values of the first overlay accuracy and the third overlay accuracy or the second overlay accuracy and the third overlay accuracy are corrected based on the average.

Moreover, another method is used to measure overlay accuracy between a first pattern formed including a plurality of marks on one substrate and a second pattern including a plurality of marks formed on the first pattern. Each of the marks of the first pattern is positioned in correspondence with any one of marks of the second pattern.

First overlay accuracy is measured by using an erected image of a reference combination of marks of first and second patterns corresponding to each other on a reference substrate provided with the first pattern and the second pattern similarly to the substrate. Second overlay accuracy is measured by using an inverted image of the reference combination of marks on the reference substrate.

Then, differences respectively are obtained between the first overlay accuracy measured by using the erected image and the second overlay accuracy measured by using the inverted image on the reference substrate. A standard deviation is calculated of the differences obtained with respect to some combinations of marks of first and second patterns.

A correction value used to correct measured values of overlay accuracy is set, and a sample number of combinations of marks of first and second patterns on the substrate to be measured is calculated based on the correction value and the standard deviation.

After that, values of the sample number of third overlay accuracy are measured by using an erected image of a combination of marks of first and second patterns corresponding to each other, and values of the sample number of fourth overlay accuracy are measured by using an erected image of the combination of marks on the substrate. Fifth overlay accuracy is measured by using an erected image or by using an inverted image of each of other combinations of first and second patterns corresponding to each other on the substrate. An average is calculated of sample differences respectively between the third overlay accuracy measured by using the erected image and the fourth overlay accuracy measured by using the inverted image.

Then, all measured values of the third overlay accuracy and the fifth overlay accuracy or the fourth overlay accuracy and the fifth overlay accuracy are corrected based on the average.

In the present invention, overlay accuracy between a first pattern and a second pattern is measured by an erected image and an inverted image at some measuring points among plural measuring points on a substrate to be measured, and overlay accuracy is measured by an erected image or an inverted image at other measuring points among plural measuring points, therefore, it is possible to shorten a measuring time compared with a case that overlay accuracy is measured by an erected image and an inverted image at all measuring points.

Moreover, overlay accuracy between a first pattern and a second pattern are measured by an erected image and an inverted image at plural measuring points on a substrate on which patterns are formed similarly to a substrate to be measured. A difference between measured values by using the erected image and by using the inverted image is calculated, and then a standard deviation of the deference is calculated. Then, a sample number to satisfy the correction value is calculated based on the standard deviation. Thus, when the substrate to be measured is measured, overlay accuracy may be measured by using the erected image and by using the inverted image only at sample measuring points, and overlay accuracy may be measured by using the erected image or by using the inverted image at other measuring points.

That is, values of overlay accuracy only at sample measuring points are measured by using the erected image and by using the inverted image, and an average of differences therebetween is obtained. Then, corrected overlay accuracy which satisfies a correction value to be a target can be obtained by subtracting the average from the measured overlay accuracy at each measuring point on a substrate to be measured.

BRIEF DESCRIPTION OF THE DRAWINGS

Other objects and advantages of the present invention will become apparent during the following discussion conjunction with the accompanying drawings, in which:

FIGS. 1(a) through 1(d) are views explaining this embodiment according to the present invention;

FIGS. 2(a) through 2(d) are views explaining this embodiment according to the present invention;

FIGS. 5(a) through 5(c) are views explaining a conventional sample.

DETAILED DESCRIPTION OF THE PREFERRED EMBODIMENTS

Preferred aspects and embodiments of the present invention will now be described with reference to the accompanying drawings.

FIGS. 1(a) through 2(d) are views explaining this embodiment according to the present invention.

Figure 3A:
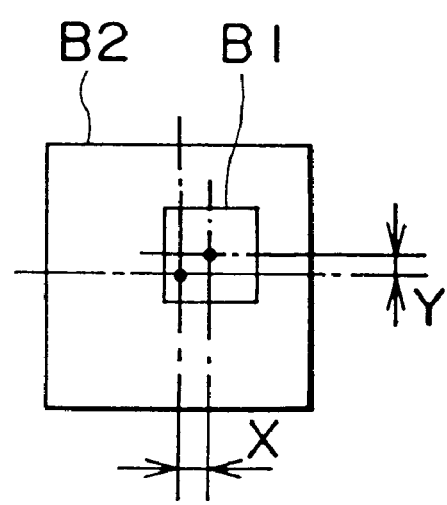
FIGS. 3(a) and 3(b) are plan views explaining an erected image and an inverted image.
Figure 3B:
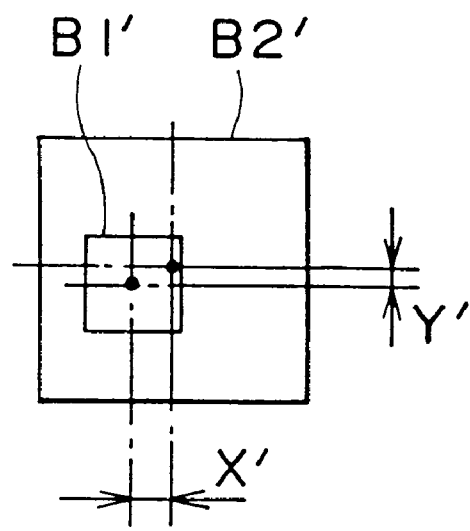

First, as shown in FIGS. 1(a) and 1(b), with a wafer 10 on which the same pattern is formed as a wafer to be measured, the overlay accuracy is measured by the erected image and the inverted image at plural measuring points on the wafer 10. The overlay accuracy, as shown in FIG. 3, is measured by using the shifts at the respective central positions in the lower box pattern B1 and the upper box pattern B2 at a measuring points. That is, A pattern including a plurality of marks is formed on a wafer, and another pattern including a plurality of marks is formed on that pattern. Overlay accuracy is measured by using the erected image and the inverted image of each of combinations of marks in the patterns.

In FIGS. 1(a) and 1(b), values of overlay accuracy of the erected image and the inverted image are measured at points <1>–<9> on the wafer 10. FIG. 1(c) shows measured overlay accuracy by the erected image ($X_1, X_2, X_3 \ldots X_9$), measured overlay accuracy by the inverted image ($X_1', X_2', X_3' \ldots X_9'$), true values of the erected image ($S_{X1}, S_{X2}, S_{X3} \ldots S_{X9}$), and values that the true value of the erected image is subtracted from the measured overlay accuracy in the erected image ($X_{TIS1}, X_{TIS2}, X_{TIS3} \ldots X_{TIS9}$).

Now, the true value is an intermediate value between the measured overlay accuracy in the erected image and that in the inverted image. For, example, when the measured overlay accuracy in the erected image is $X_1$ and that in the inverted image is $X_1'$, the following expression (1) shows the true value $S_{X1}$.

$$S_{X1} = -(X_1 + X_1')/2 + X_1 \qquad (1)$$

Assuming $X_1 = -0.003$ ($\mu$m) and $X_1' = 0.044$ ($\mu$m), $S_{X1} = -0.039$ ($\mu$m) and $X_{TIS1} = 0.006$ ($\mu$m).

FIG. 1(d) shows measured overlay accuracy in the erected image ($Y_1, Y_2, Y_3 \ldots Y_9$), measured overlay accuracy in the inverted image ($Y_1', Y_2', Y_3' \ldots Y_9'$), true values of the erected image ($S_{Y1}, S_{Y2}, S_{Y3} \ldots S_{Y9}$), and values that the true values of the erected image are subtracted from the measured overlay accuracy in the erected image ($Y_{TIS1}, Y_{TIS2}, Y_{TIS3} \ldots Y_{TIS9}$).

In FIGS. 1(c) and 1(d), standard deviations $X_{TIS\sigma}, Y_{TIS\sigma}$ are respectively obtained concerning the calculated TISs in the erected image and in the inverted image.

Then, a corrected TIS to be a target is set, and then a sample number is calculated by the previously obtained standard deviation and the following expression (2); where $\beta$ is the corrected TIS to be a target, $\sigma$ is the previously obtained standard deviation and n is the sample number.

$$\beta = 3\sigma/\sqrt{n} \qquad (2)$$

For example, assuming that the previously obtained standard deviation is $\sigma = 0.0012$ $\mu$m and the corrected TIS to be a target is $\beta = 0.003$ $\mu$m;

$\beta = 3\sigma/\sqrt{n}$ $n = 9\sigma^2/\beta^2$ $= 9 \times (0.0012)^2/(0.003)^2$ $= 1.44$ $\approx 2$.

That is, two sample points can satisfy 0.003 $\mu$m which is the corrected TIS to be a target.

Further, assuming that the same standard deviation $\sigma$ is used and the corrected TIS to be a target is $\beta = 0.0015$ $\mu$m;

$n = 9\sigma^2/\beta^2$ $= 9 \times (0.0012)^2/(0.0015)^2$ $= 5.76$ $\approx 2$

That is, six sample points can satisfy 0.0015 $\mu$m which is the corrected TIS to be a target.

Additionally, an expression for calculating a sample number is not limited to the expression (2), therefore, another expression can be used.

Next, as shown in FIGS. 2(a) and 2(b), overlay accuracy is measured as to a wafer 10' to be measured. In this measurement, the overlay accuracy of only the calculated sample number is measured both in the inverted image shown in FIG. 2(a) and in the erected image shown in FIG. 2(b), and the overlay accuracy is measured at other measuring points in the erected image shown in FIG. 2(b).

When the calculated sample number is n=3, overlay accuracy is measured at three measuring points <2>, <4>, <7> both in the inverted image and in the erected image. At other measuring points <1>, <3>, <5>, <6>, <8>, <9>, overlay accuracy is measured only in the erected image shown in FIG. 2(b). Further, it is possible to set three measuring points <2>, <4>, <7> in which overlay accuracy is measured both in the inverted image and in the erected image on the wafer 10' at random. Any three points may be selected among points <1>–<9>.

FIG. 2(c) is a view showing measured overlay accuracy in the erected image in the X direction ($X_1, X_2, X_3 \ldots X_9$), measured overlay accuracy at three points in the inverted image in the X direction ($X_1', X_2', X_3'$), true values at the three points in the erected image ($S_{X1}, S_{X2}, S_{X3}$), and values that the true values of the erected image are respectively subtracted from the measured overlay accuracy at the three points in the erected image ($X_{TIS1}, X_{TIS2}, X_{TIS3}$).

FIG. 2(d) is a view showing measured overlay accuracy in the erected image in the Y direction ($Y_1, Y_2, Y_3 \ldots Y_9$), measured overlay accuracy at three points in the inverted image in the Y direction ($Y_1', Y_2', Y_3'$), true values at the three points in the erected image ($S_{Y1}, S_{Y2}, S_{Y3}$), and values that the true values of the erected image are respectively subtracted from the measured overlay accuracy at the three points in the erected image ($Y_{TIS1}, Y_{TIS2}, Y_{TIS3}$).

Then, as shown in FIGS. 2(c) and 2(d), averages $X_{ave}$, $Y_{ave}$ of the measured values at the measuring points in the erected image and averages $X_{TISave}$, $Y_{TISave}$ of the TISs at the three points are obtained. The $X_{ave}$ is an average of the measured values at the respective measuring points in the erected image in the X direction, and the $X_{ave}$ is an average in the Y direction. The $X_{TISave}$ is an average of the TISs in the X direction, and the $Y_{TISave}$ is an average of the TISs in the Y direction.

After that, as the correction process for measured overlay accuracy, the averages $X_{TISave}$, $Y_{TISave}$ of the TISs are respectively subtracted from the averages $X_{ave}$, $Y_{ave}$ of the measured values at the measuring points in the erected image in the X direction and in the Y direction.

That is, a value X obtained by correcting the measured value in the X direction is written as;

$X = X_{ave} - X_{TISave}$.

Then, a value Y obtained by correcting the measured value in the Y direction is written as;

$Y = Y_{ave} - Y_{TISave}$.

Thus, it is possible to calculate TISs by minimum measuring points which a predetermined correction accuracy can be obtained without measuring overlay accuracy at all measuring points both in the erected image and in the inverted image, and it is possible to correct the TISs.

That is, only concerning the sample number which is previously calculated, the overlay accuracy both in the erected image and in the inverted image is measured, whereby it is possible to satisfy the TIS β to be the target in that calculation. Thus, TISs of the minimum sample number are obtained, and then the TISs are subtracted from the measured overlay accuracy at the measuring points, whereby it becomes possible to obtain a satisfactory corrected accuracy.

In this overlay accuracy measuring method, a standard deviation of the TISs is previously obtained with the wafer 10 (see FIG. 1) provided with patterns similar to those in a wafer to be measured, and then a sample number is calculated with this standard deviation. The present invention is not limited to this. After obtaining the standard deviation of the TISs in the wafer 10, the standard deviation may be stored in a data base. In this case, the TIS standard deviation corresponding to the wafer 10' (see FIG. 2) is read from the data base when the sample number is calculated, and then the sample number is calculated by the read TIS standard deviation.

In this data base, plural kinds (such as various processes) of TIS standard deviations in the wafer 10 are stored. When overlay accuracy is measured in the wafer 10' to be measured, the TIS standard deviation corresponding to the wafer 10' is read from the data base and the sample number is calculated, whereby overlay accuracy is actually measured.

For example, when the corrected TIS value β to be a target is changed and the sample number is calculated again, the TIS standard deviation used for the sample calculation before changing is read from the data base and then a new sample number is calculated by using this standard deviation with the TIS β to be a target after changing.

As a result, it is unnecessary to obtain a TIS standard deviation by measuring overlay accuracy with both of the erected image and the inverted image at plural points in the wafer 10 again, therefore, it becomes possible to calculate a sampling number after changing in a short time.

Next, an explanation will be given of an overlay accuracy measuring apparatus which uses the above mentioned overlay accuracy measuring method.

Figure 4:
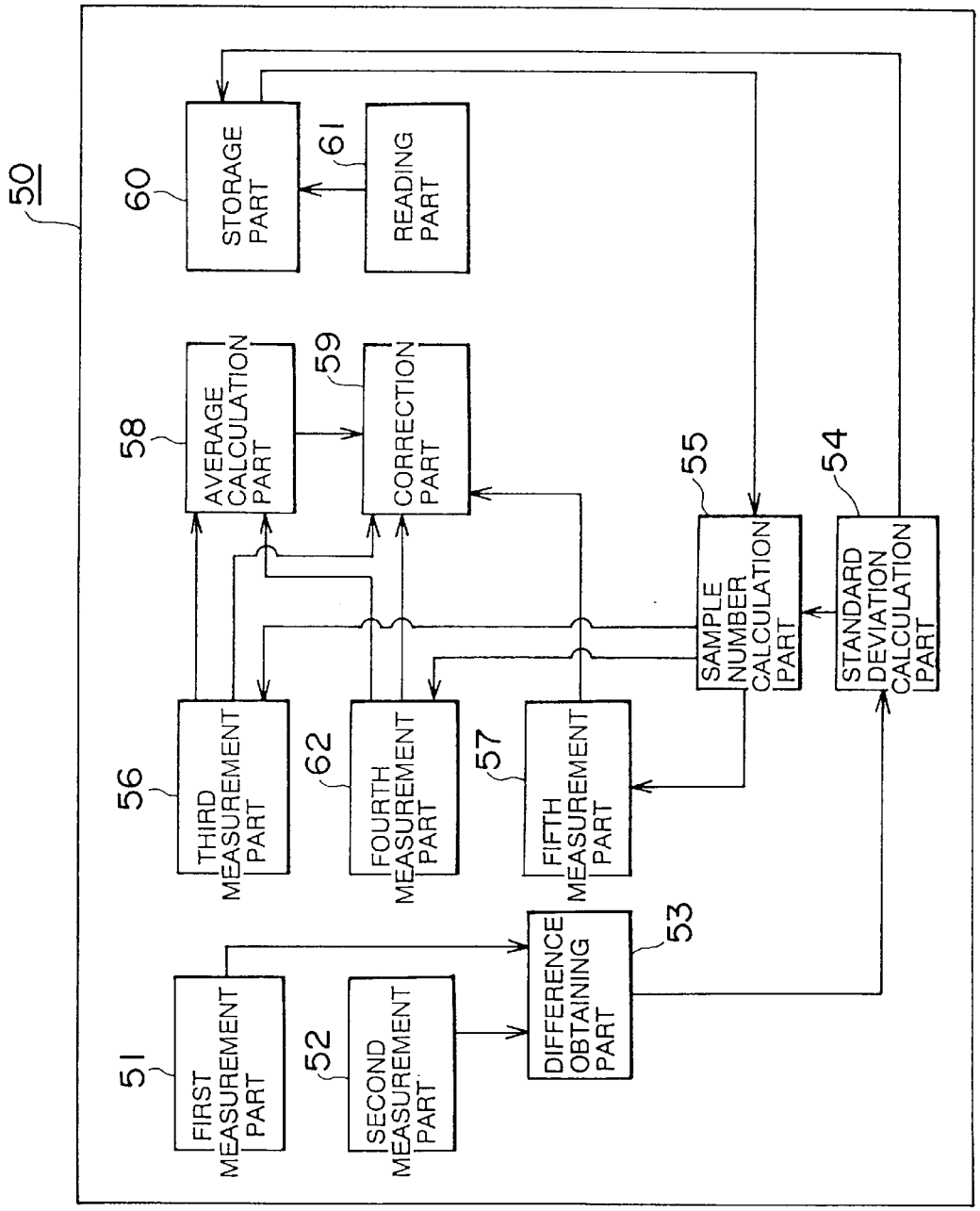
FIG. 4 is a block diagram illustrating an overlay accuracy measuring apparatus according to the present invention.

As shown in FIG. 4, the overlay accuracy measuring apparatus 50 is used to measure overlay accuracy between a first pattern formed on one substrate and a second pattern formed on the first pattern.

This apparatus comprises a first measurement part 51, a second measurement part 52, a difference obtaining part 53, a standard deviation calculation part 54, a sample number calculation part 55, a third measurement part 56, a fourth measurement part 62, a fifth measurement part 57, an average calculation part 58, a correction part 59, a storage part 60, and a reading part 61. These parts are implemented in an existing overlay accuracy measuring apparatus by installing a new program or the like.

The first measurement part 51 measures a first overlay accuracy by using an erected image at each of measuring points on a reference substrate provided with the first pattern and the second pattern similarly to the one substrate.

The second measurement part 52 measures a second overlay accuracy by using an inverted image at each of the measuring points on the reference substrate.

The difference obtaining part 53 obtains respective differences between the first overlay accuracy measured by the first measurement means and the second overlay accuracy measured by the first measurement means at the measuring points on the reference substrate.

The standard deviation calculation part 54 calculates a standard deviation of the differences at the measuring points on the reference substrate.

The sample number calculation part 55 sets a correction value and calculates a sample number of the measuring points on the substrate to be measured to satisfy the correction value based on the standard deviation.

The third measurement part 56 measures the third overlay accuracy by using an erected image and a fourth overlay accuracy by using an inverted image at each of sample measuring points among plural measuring points on the one substrate.

The fourth measurement part 57 measures a fifth overlay accuracy by using an erected image or by using an inverted image at each of other measuring points but the sample measuring points among the measuring points on the substrate.

The average calculation part 58 calculates an average of differences respectively between the third overlay accuracy measured the third measurement part 56.

The correction part 59 corrects all overlay accuracy at each of the measuring points on the substrate based on the average calculated by the average calculation part 58.

The storage part 60 stores the standard deviation of the differences.

The reading part 61 reads the standard deviation corresponding to the substrate to be measured from the storage part 60.

According to this apparatus, the above mentioned overlay accuracy measuring method is carried out.

As above described, according to the overlay accuracy measuring method and apparatus of the present invention, there are effects as follows. That is, a TIS standard deviation is previously obtained in a substrate and a sample number satisfying a corrected TIS is calculated, therefore, it is possible to measure values to correct a TIS sufficiently in a short time without measuring a plane inverted image wastefully.

Moreover, the overlay accuracy between a plane erected image and a plane inverted image is measured at points of this sample number in a substrate to be actually measured, the average of the TISs is used as a correction value, and the correction value is subtracted from the measured values at respective measuring points in the plane erected image or the plane inverted image, whereby it is possible to correct a dispersion which occurs by variation of formed patterns on the substrate.

This invention being thus described, it will be obvious that same may be varied in various ways. Saturations are not to be regarded as departure from the spirit and scope of the invention, and all such modifications would be obvious for one skilled in the art intended to be included within the scope of the following claims.

What is claimed is:

1. A method of measuring overlay accuracy between a first pattern including a plurality of marks formed on a substrate and a second pattern including a plurality of marks formed on the first pattern, each of said marks of the first pattern positioned in correspondence with any one of said marks of the second pattern, said method comprising:
   a step of measuring first overlay accuracy by using an erected image of a combination of marks of first and second patterns corresponding to each other;
   a step of measuring second overlay accuracy by using an inverted image of the combination of marks;
   a step of respectively obtaining differences between the first overlay accuracy measured by using the erected image and the second overlay accuracy measured by using the inverted image;
   a step of calculating an average of the differences obtained with respect to some combinations of marks of first and second patterns;
   a step of measuring third overlay accuracy by using an erected image or an inverted image of each of other combinations of marks of first and second patterns;
   a step of correcting all measured values of said first overlay accuracy and said third overlay accuracy or said second overlay accuracy and said third overlay accuracy based on the average.

2. A method according to the claim 1, wherein said first accuracy and said second accuracy are measured at random on the substrate to be measured.

3. A method of measuring overlay accuracy between a first pattern including a plurality of marks formed on a substrate and a second pattern including a plurality of marks formed on the first pattern, each of said marks of the first pattern positioned in correspondence with any one of said marks of the second pattern, said method comprising:
   a step of measuring first overlay accuracy by using an erected image of a reference combination of marks of first and second patterns corresponding to each other on a reference substrate provided with the first pattern and the second pattern similarly to the substrate;
   a step of measuring second overlay accuracy by using an inverted image of the reference combination of marks;
   a step of respectively obtaining differences between the first overlay accuracy measured by using the erected image and the second overlay accuracy measured by using the inverted image on the reference substrate;
   a step of calculating a standard deviation of the differences obtained with respect to some reference combinations of marks;
   a step of setting a correction value used to correct measured values of overlay accuracy of the substrate to be measured;
   a step of calculating a sample number of combinations of first and second patterns on the substrate to be measured based on the standard deviation and the correction value;
   a step of measuring values of third overlay accuracy of the sample number by using an erected image of a combination of marks of first and second patterns corresponding to each other on the substrate;
   a step of measuring values of fourth overlay accuracy of the sample number by using an inverted image of the combination of marks;
   a step of measuring values of fifth overlay accuracy by using an erected image or by using an inverted image of each of other combinations of marks of first and second patterns corresponding to each other on the substrate;
   a step of calculating an average of sample differences respectively between the third overlay accuracy measured by using the erected image and the fourth overlay accuracy measured by using the inverted image; and
   a step of correcting all measured values of said third overlay accuracy and said fifth overlay accuracy or said fourth overlay accuracy and said fifth overlay accuracy based on the average.

4. A method according to the claim 3, wherein said third overlay accuracy and said fourth overlay accuracy are measured at random on the substrate.

5. A method according to the claim 3, further comprising:
   a step of storing the standard deviation of the differences in a data base; and
   a step of reading the standard deviation corresponding to another substrate to be measured from the data base.

6. An apparatus for measuring overlay accuracy between a first pattern including a plurality of marks formed on a substrate and a second pattern including a plurality of marks formed on the first pattern, each of said marks of the first pattern positioned in correspondence with any one of said marks of the second pattern, said apparatus comprising:

first measurement means for measuring first overlay accuracy by using an erected image of a reference combination of marks of first and second patterns corresponding to each other on a reference substrate provided with the first pattern and the second pattern similarly to the one substrate;

second measurement means for measuring second overlay accuracy by using an inverted image of the reference combination of marks;

difference obtaining means for respectively obtaining differences between the first overlay accuracy measured by using the erected image and the second overlay accuracy measured by using the inverted image on the reference substrate;

standard deviation calculation means for calculating a standard deviation of the differences obtained with respect to some reference combinations of marks of first and second patterns on the reference substrate;

sample number calculation means for setting a correction value used to correct measured values of overlay accuracy and calculating a sample number of combinations of marks of first and second patterns on the substrate to be measured based on the correction value and the standard deviation;

third measurement means for measuring values of third overlay accuracy of the sample number by using an erected image of a combination of marks of first and second patterns corresponding to each other on the substrate;

fourth measurement means for measuring values of fourth overlay accuracy of the sample number by using an inverted image of the combination of marks;

fifth measurement means for measuring fifth overlay accuracy by using an erected image or by using an inverted image of each of other combinations of marks of first and second patterns corresponding to each other on the substrate;

average calculation means for calculating an average of differences respectively between the third overlay accuracy measured by the third measurement means and the fourth accuracy measured by the fourth measurement means; and correction means for correcting the third overlay accuracy and the fifth overlay accuracy or the fourth overlay accuracy and the fifth overlay accuracy on the substrate based on the average calculated by the average calculation means.

7. An apparatus according to the claim 6, further comprising:

storage means for storing the standard deviation of the differences; and reading means for reading the standard deviation corresponding to the substrate to be measured from the storage means.

\* \* \* \* \*